(12) United States Patent
Suzuki et al.

(10) Patent No.: US 11,067,477 B2
(45) Date of Patent: Jul. 20, 2021

(54) WAVEFRONT MEASUREMENT DEVICE AND WAVEFRONT MEASUREMENT SYSTEM

(71) Applicant: MITSUBISHI ELECTRIC CORPORATION, Tokyo (JP)

(72) Inventors: Masataka Suzuki, Tokyo (JP); Takayuki Yanagisawa, Tokyo (JP); Shigetaka Itakura, Tokyo (JP); Takayasu Anada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/862,912

(22) Filed: Apr. 30, 2020

(65) Prior Publication Data

US 2020/0256761 A1    Aug. 13, 2020

Related U.S. Application Data

(63) Continuation of application No. PCT/JP2018/001558, filed on Jan. 19, 2018.

(51) Int. Cl.
  *G01B 11/02* (2006.01)
  *G01M 11/02* (2006.01)
  *G01J 9/00* (2006.01)

(52) U.S. Cl.
  CPC ............ *G01M 11/0264* (2013.01); *G01J 9/00* (2013.01); *G01J 2009/002* (2013.01)

(58) Field of Classification Search
  CPC .... G01B 9/02; G01B 11/2441; G01B 11/306; G01B 11/303; G01J 9/02
(Continued)

(56) References Cited

U.S. PATENT DOCUMENTS

| 9,247,874 B2* | 2/2016 | Kumar ................. G03H 1/0866 |
| 2006/0175528 A1 | 8/2006 | Greenaway et al. |
| 2018/0061019 A1* | 3/2018 | Wachi ..................... G06T 5/003 |

FOREIGN PATENT DOCUMENTS

| EP | 2 012 102 A1 | 1/2009 |
| JP | 2005-331440 A | 12/2005 |

OTHER PUBLICATIONS

Anderson et al., "Toward High-Precision Astometry with WFPC2.I. Deriving an Accurate Point-Speed Function", PASP, 2000, vol. 112, No. 776, pp. 1360-1382.
(Continued)

*Primary Examiner* — Md M Rahman
(74) *Attorney, Agent, or Firm* — Birch, Stewart, Kolasch & Birch, LLP.

(57) ABSTRACT

The wavefront measurement device performs: generating a first pupil function at a reference wavelength based on input data of a wavefront aberration; calculating a first image plane amplitude at a reference wavelength based on the first pupil function; generating a second pupil function at a multi-wavelength region; calculating a second image plane amplitude at the multi-wavelength region based on the second pupil function; correcting a measured point spread function using the first and second image plane amplitudes; applying a constraint condition using the corrected point spread function to the first image plane amplitude to correct the first image plane amplitude; generating a third pupil function based on the corrected first image plane amplitude; and calculating a wavefront aberration on a pupil plane based on the third pupil function.

9 Claims, 8 Drawing Sheets

(58) Field of Classification Search
USPC .......................................................... 356/512
See application file for complete search history.

(56) References Cited

OTHER PUBLICATIONS

Dongming et al., "Research on Wavefront Correction Algorithm of Adaptive Optics System", 4th International Conference on Computer Science and Networks Technology (ICCSNT), 2015, pp. 23-27.

Gerchberg et al., "A Prectical Algorithm for the Determination of Phase from Image and Diffraction Plane Pictures", Optik, 1972, vol. 35, No. 2, pp. 237-246.

Green et al., "extreme Wave Front Sensing Accuracy for the Eclipse Coronagraphic Space Telescope", Proceedings of the SPIE, 2003, vol. 4860, pp. 266-276.

Huang et al., "Adaptive Surface Shape Control for Magnetic Fluid Deformable Mirrors", International Conference on Control, Automation and Information Sciences (ICCAIS), 2015, pp. 376-383.

Taylor, "In-Flight performance assessment of imaging systems using the specular array radiometric calibration (SPARC) method", 11th Annual Joint Agency Commercial Immagery Evaluation (JACIE) Workshop, 2012, pp. 1-26.

Extended European Search Report issued to the corresponding European Patent Application No. 18 901 530.8.

\* cited by examiner

WAVEFRONT MEASUREMENT DEVICE AND WAVEFRONT MEASUREMENT SYSTEM

CROSS REFERENCE TO RELATED APPLICATIONS

This application is a Continuation of PCT International Application No. PCT/JP2018/001558 filed on Jan. 19, 2018, which is hereby expressly incorporated by reference into the present application.

TECHNICAL FIELD

The present invention relates to a technique for measuring a wavefront aberration, and more particularly, to a technique for measuring a wavefront aberration on the basis of a point spread function (PSF).

BACKGROUND ART

Wavefront aberration measurement technology is widely used for quantitatively evaluating the characteristics of an object, such as a light source, an optical system (e.g., a lens or a reflector), or a light propagation path (a path through which light propagates between the object and the observation equipment). For example, in order to evaluate the performance of an objective lens of an optical microscope, a technique of detecting diffracted light transmitted through the objective lens and measuring a wavefront aberration is known. In addition, in the case of an observation device for remote sensing (observing an object such as the earth's surface or outer space), the optical characteristics of the observation device or the characteristics of the light propagation path may change due to the effects of vibration or the surrounding environment during the operation of the observation device, and thereby wavefront aberrations may be generated. Such a wavefront aberration deteriorates the quality of an observed image. It is possible to use a technique for measuring the wavefront aberration in order to cope with such deterioration of the quality of the observed image. For example, on the basis of the measurement amount of the wavefront aberration, an optical characteristic of the observation device is adaptively corrected, or a change in the characteristic of the light propagation path is compensated so as to reduce the wavefront aberration, and thereby a high-resolution observed image can be obtained.

There is a plurality of methods for measuring a wavefront aberration. One of these methods is a method of estimating a wavefront aberration on the basis of a point spread function (PSF). The point spread function theoretically refers to an intensity distribution of a blurred optical image formed on an image plane when an infinitesimal point is imaged. Wavefront aberration estimation techniques based on point spread functions are disclosed in, for example, the following Non-Patent Literatures 1 and 2. Non-Patent Literature 1 discloses a method of estimating a spatial phase distribution of a complex amplitude of light on a pupil plane from an intensity distribution of light observed on an image plane on the basis of an iterative operation algorithm called a Gerchberg-Saxton algorithm (hereinafter, referred to as a "GS algorithm"). The wavefront aberration can be estimated from the estimated spatial phase distribution. Non-Patent Literature 2 discloses a method of detecting a wavefront aberration by using a defocused point spread function on the basis of a modified Gerchberg-Saxton algorithm (hereinafter, referred to as "MGS algorithm").

CITATION LIST

Non-Patent Literatures

Non-Patent Literature 1: R. W. Gerchberg and W. O. Saxton, "A Practical Algorithm for the Determination of Phase from Image and Diffraction Plane Pictures", Optik, vol. 35, No. 2, pp. 237-246 (1972).

Non-Patent Literature 2: Joseph J. Green, David C. Redding, Stuart B. Shaklan and Scott A. Basinger, "Extreme Wave Front Sensing Accuracy for the Eclipse Coronagraphic Space Telescope", Proceedings of the SPIE, Volume 4860, pp. 266-276 (2003).

SUMMARY OF INVENTION

Technical Problem

When the observable wavelength region is wide, influences of light components of various wavelengths are reflected in the point spread function. Specifically, since the size of an Airy disk indicating the minimum spot diameter on the image plane is proportional to the wavelength, different sizes of Airy disk diameter are generated depending on light components of various wavelengths. The spatial phase distribution of the complex amplitude of light on the pupil plane also has wavelength dependency. Therefore, when the observable wavelength region is wide, even if the above-mentioned GS algorithm and MGS algorithm are used, there is a problem that the estimation accuracy of the wavefront aberration degrades due to the wavelength dependency of the Airy disk diameter and the wavelength dependency of the spatial phase distribution on the pupil plane.

In view of the above, it is an object of the present invention to provide a wavefront measurement device and a wavefront measurement system that can suppress degradation in wavefront aberration estimation accuracy even when the observable wavelength band is wide.

Solution to Problem

The wavefront measurement device according to one aspect of the present invention includes: a first pupil-function generating unit for generating a first pupil function by calculating a first optical phase distribution on a pupil plane at a reference wavelength selected from a multi-wavelength region on the basis of input data of a wavefront aberration and applying a first constraint condition to the first optical phase distribution; a first image-plane amplitude calculating unit for calculating a first image plane amplitude at the reference wavelength on the basis of the first pupil function; a second pupil-function generating unit for generating a second pupil function by calculating a second optical phase distribution on the pupil plane at the multi-wavelength region on the basis of the input data and applying the first constraint condition to the second optical phase distribution; a second image-plane amplitude calculating unit for calculating a second image plane amplitude at the multi-wavelength region on the basis of the second pupil function; a PSF correction unit for correcting a measured point spread function by suppressing spatial frequency components at wavelengths other than the reference wavelength in spatial frequency components of the point spread function by using a spatial frequency component of the first image plane amplitude and a spatial frequency component of the second image plane amplitude; a constraint condition applying unit for applying a second constraint condition using the corrected point spread function to the first image plane amplitude to correct the first image plane amplitude; a third pupil-function generating unit for generating a third pupil function on the basis of the corrected first image plane amplitude; and a wavefront calculation unit for calculating a wavefront aberration on the pupil plane on the basis of the third pupil function, in which the wavefront calculation unit causes, by inputting data of the calculated wavefront aberration to the first pupil-function generating unit and the second pupil-function generating unit, the first pupil-function generating unit, the first image-plane amplitude calculating unit, the second pupil-function generating unit, the second image-plane amplitude calculating unit, the PSF correction unit, the constraint condition applying unit, the third pupil-function generating unit, and the wavefront calculation unit to execute an iterative operation.

Advantageous Effects of Invention

According to the present invention, even if the observable wavelength region is a wide band, the wavefront aberration on a pupil plane can be estimated with high precision.

DESCRIPTION OF EMBODIMENTS

Figure 1:
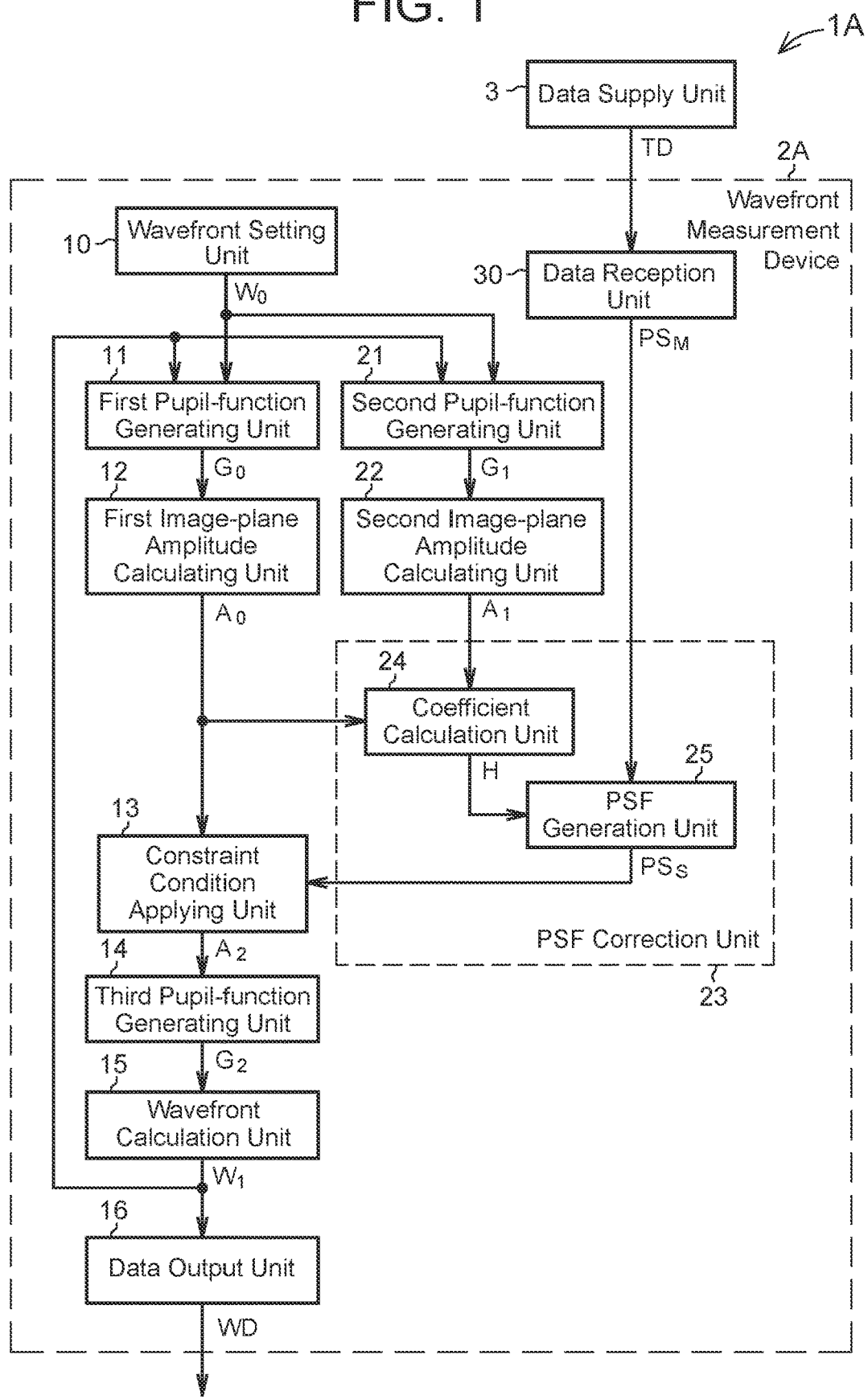
FIG. 1 is a block diagram schematically showing a configuration of a wavefront measurement system according to a first embodiment of the present invention.

Hereinafter, various embodiments according to the present invention will be described in detail with reference to the drawings. Note that components given the same reference numerals throughout the drawings have the same configuration and the same function.

First Embodiment

FIG. 1 is a block diagram schematically showing a configuration of a wavefront measurement system 1A according to a first embodiment of the present invention. As shown in FIG. 1, the wavefront measurement system 1A includes a data supply unit 3 that supplies measurement data TD including data of a measured point spread function (PSF) to a wavefront measurement device 2A, and the wavefront measurement device 2A that measures a wavefront aberration on a pupil plane of an optical system on the basis of point spread function data included in the measurement data TD. The data supply unit 3 and the wavefront measurement device 2A are connected via a wired communication path such as a cable or a wireless communication path. The data supply unit 3 has a communication function of transferring measured point spread function data to the wavefront measurement device 2A. The data supply unit 3 may further have a function as a detector that detects a point image and generates a point spread function.

Figure 2:
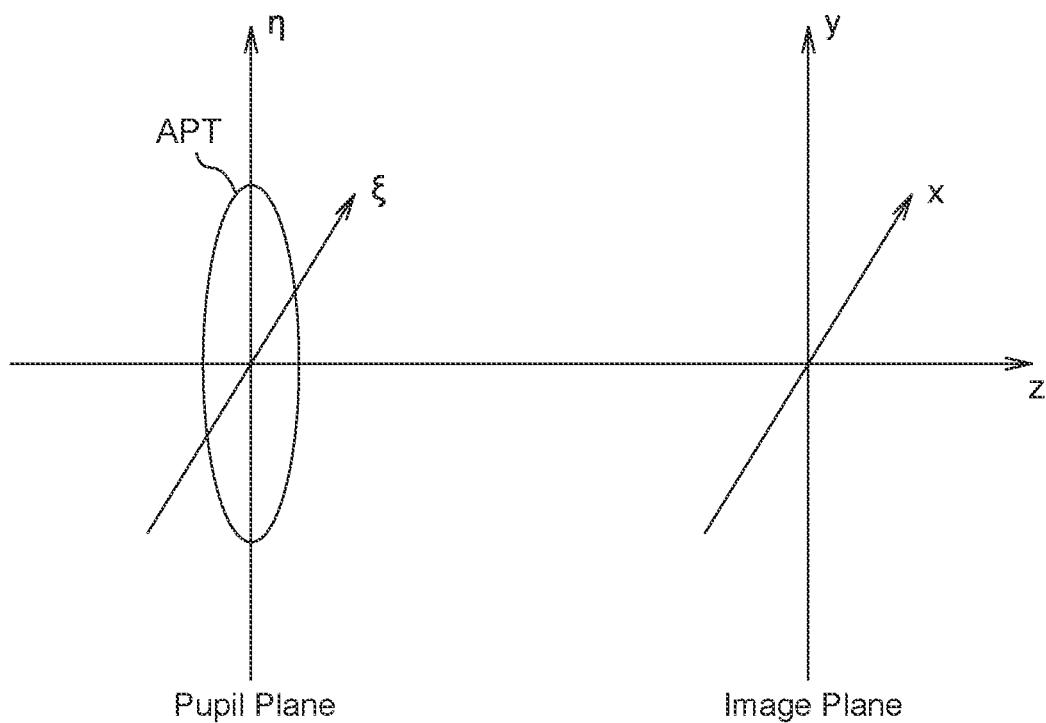
FIG. 2 is a diagram schematically showing an example of arrangement of a pupil plane and an image plane of an optical system.

FIG. 2 is a diagram schematically showing an example of arrangement of a pupil plane and an image plane of the optical system. The point spread function refers to an intensity distribution of a blurred optical image (an optical image having a spatial spread) observed on an image plane when the optical system images a point light source. In the example of FIG. 2, the pupil plane and the image plane are separated from each other in the z-axis direction. Hereinafter, for convenience of explanation, the spatial coordinates of the rectangular coordinate system on the pupil plane are represented by $(\xi, \eta)$, and the spatial coordinates of the rectangular coordinate system on the image plane are represented by $(x, y)$.

As shown in FIG. 1, the wavefront measurement device 2A of the present embodiment includes a wavefront setting unit 10, a first pupil-function generating unit 11, a first image-plane amplitude calculating unit 12, a constraint condition applying unit 13, a third pupil-function generating unit 14, a wavefront calculation unit 15, a data output unit 16, a second pupil-function generating unit 21, a second image-plane amplitude calculating unit 22, a PSF correction unit 23, and a data reception unit 30. The data reception unit 30 receives the measurement data TD transferred from the data supply unit 3 and supplies data of a point spread function $PS_M$ included in the measurement data TD to the PSF correction unit 23. As will be described later, the wavefront measurement device 2A can calculate the wavefront aberration on the pupil plane by executing an iterative operation using the point spread function $PS_M$.

The wavefront setting unit 10 sets an initial wavefront aberration $W_0$ for the iterative operation and supplies the set initial wavefront aberration $W_0$ to the first pupil-function generating unit 11 and the second pupil-function generating unit 21. The initial wavefront aberration $W_0$ can be set to have an arbitrary wavefront shape. For example, the wavefront setting unit 10 can set the initial wavefront aberration $W_0$ in a format of image data or a format that specifies Zernike coefficients. When the initial wavefront aberration $W_0$ is set using the Zernike coefficients, the initial wavefront aberration $W_0$ is expressed by the following equation (1).

$$W_0(\xi, \eta) = \sum_{k=1}^{K} z_k C_k(\xi, \eta) \tag{1}$$

Here, $W_0(\xi, \eta)$ is a function representing the initial wavefront aberration $W_0$ on the pupil plane, $\xi$, $\eta$ is the value of the spatial coordinates of the rectangular coordinate system on the pupil plane, and $z_k$ is the k-th Zernike Coefficients, $C_k$ is the k-th Zernike Terms, and K is a positive integer indicating the number of modes. The Zernike terms $C_k(\xi, \eta)$ is known. The initial wavefront aberration $W_0$ can be set by appropriately selecting the values of the Zernike coefficients $z_k$ (k=1 to K). The larger the value of K, the more complicated wavefront aberration can be expressed.

The first pupil-function generating unit 11, on the basis of the input data of the initial wavefront aberration $W_0$ from the wavefront setting unit 10 or the input data of a wavefront aberration $W_1$ fed back from the wavefront calculation unit 15, calculates a first optical phase distribution on the pupil plane at a reference wavelength $\lambda_0$. In addition, the first pupil-function generating unit 11 generates a first pupil function $G_0$ representing a complex amplitude distribution on the pupil plane by applying a first constraint condition (pupil plane constraint condition) to the first optical phase distribution, and supplies the generated first pupil function $G_0$ to the first image-plane amplitude calculating unit 12. The reference wavelength $\lambda_0$ is a reference wavelength selected from an observable wavelength region (hereinafter, referred to as "multi-wavelength region") including various wavelengths.

For example, the first optical phase distribution $O(\xi, \eta, \lambda)$ for the wavelength $\lambda$, is represented by the following equation (2).

$$O(\xi, \eta, \lambda) = \exp\left(2\pi i \frac{W(\xi, \eta)}{\lambda}\right) \quad (2)$$

Here, $\lambda$ is an arbitrary wavelength in a multi-wavelength region, $W(\xi, \eta)$ is a function representing a wavefront aberration on a pupil plane, $O(\xi, \eta, \lambda)$ is a function representing the complex amplitude distribution of light on the pupil plane for the wavelength $\lambda$, and i is an imaginary unit ($i^2=-1$).

When the first pupil-function generating unit 11 calculates the first optical phase distribution on the basis of the input data of the initial wavefront aberration $W_0$, $W(\xi, \eta)=W_0(\xi, \eta)$ and $\lambda=\lambda_0$. On the other hand, when the first optical phase distribution is calculated on the basis of the input data of the wavefront aberration $W_1$ fed back for the iterative operation, $W(\xi, \eta)=W_1(\xi, \eta)$ and $\lambda_0$. The first optical phase distribution $O(\xi, \eta, \lambda_0)$ based on the input data of the initial wavefront aberration $W_0$ can be expressed by the following equation (3).

$$O(\xi, \eta, \lambda_0) = \exp\left(2\pi i \frac{W_0(\xi, \eta)}{\lambda_0}\right) \quad (3)$$

Further, the first pupil function $G_0(\xi, \eta)$ can be expressed by, for example, the following equation (4).

$$G_0(\xi, \eta) = t(\xi, \eta) \times O(\xi, \eta, \lambda_0) = t(\xi, \eta) \times \exp\left(2\pi i \frac{W(\xi, \eta)}{\lambda_0}\right) \quad (4)$$

Here, $t(\xi, \eta)$ is a function that determines a first constraint condition applied to the first optical phase distribution $O(\xi, \eta, \lambda_0)$, and $W(\xi, \eta)$ is $W_0(\xi, \eta)$ or $W_1(\xi, \eta)$. $t(\xi, \eta)$ spatially limits the intensity on the pupil plane. The function $t(\xi, \eta)$ is set so that the intensity of the pupil function is constant inside the circular opening APT of the pupil plane and is zero outside the circular opening. When the circular opening APT is provided on the pupil plane as shown in FIG. 2, $t(\xi, \eta)$ can be expressed by the following equation (5).

$$t(\xi, \eta) = \begin{cases} I_0, & \sqrt{\xi^2 + \eta^2} \leq D/2 \\ 0, & \sqrt{\xi^2 + \eta^2} > D/2 \end{cases} \quad (5)$$

Here, $I_0$ is a constant value, and D is a diameter of the circular opening APT.

Next, the first image-plane amplitude calculating unit 12, on the basis of the first pupil function $G_0$, calculates a first image plane amplitude $A_0$ representing the complex amplitude distribution on the image plane at the reference wavelength $\lambda_0$, and gives the calculated first image plane amplitude $A_0$ to the constraint condition applying unit 13 and the PSF correction unit 23. Here, the first image-plane amplitude calculating unit 12 can calculate the first image plane amplitude $A_0$ by using parameters such as an F value of the optical system and a wavelength sensitivity of the observation system.

It is known that there is an approximate Fourier transform relationship between the pupil plane and the image plane. If a two-dimensional Fourier transform operator from the pupil plane to the image plane is represented by $F_0[\ ]$, the first image plane amplitude $A_0(x, y)$ can be approximately expressed by the following equation (6).

$$A_0(x, y) = \frac{1}{\lambda_0 f} F_0[G_0(\xi, \eta)] = \frac{1}{\lambda_0 f} F_0\left[t(\xi, \eta) \times \exp\left(2\pi i \frac{W(\xi, \eta)}{\lambda_0}\right)\right] \quad (6)$$

Here, $A_0(x, y)$ is a function representing the complex amplitude distribution on the image plane. x and y are variables corresponding to $\xi$ and $\eta$, respectively, and are values of the spatial coordinates of the rectangular coordinate system on the image plane. f represents the focal length of an imaging system.

On the other hand, on the basis of the input data of the initial wavefront aberration $W_0$ from the wavefront setting unit 10 or the input data of the wavefront aberration $W_1$ fed back from the wavefront calculation unit 15, the second pupil-function generating unit 21 calculates the second optical phase distribution on the pupil plane at the multi-wavelength region. In addition, the second pupil-function generating unit 21 generates a second pupil function $G_1$ representing the complex amplitude distribution on the pupil plane by applying the first constraint condition to the second optical phase distribution, and supplies the generated second pupil function $G_1$ to the second image-plane amplitude calculating unit 22. The second image-plane amplitude calculating unit 22 calculates a second image plane amplitude $A_1$ representing a complex amplitude distribution on an image plane at a multi-wavelength region on the basis of the second pupil function $G_1$, and gives the calculated second image plane amplitude $A_1$ to the PSF correction unit 23. Here, the second image-plane amplitude calculating unit 22 can calculate the second image plane amplitude $A_1$ by using parameters such as the F value of the optical system and the wavelength sensitivity of the observation system.

For example, the second pupil function $G_1$ can be expressed by using the above equation (2) as shown in the following equation (7).

$$G_1(\xi, \eta) = t(\xi, \eta) \times O(\xi, \eta, \lambda) = t(\xi, \eta) \times \exp\left(2\pi i \frac{W(\xi, \eta)}{\lambda}\right) \quad (7)$$

Here, $G_1(\xi, \eta)$ is a function representing the second pupil function on the pupil plane.

The second pupil function $G_1(\xi, \eta)$ includes components of various wavelengths at a multi-wavelength region. Therefore, when the lower limit (minimum wavelength) of the multi-wavelength region is represented by $\lambda_1$, and the upper limit (maximum wavelength) of the multi-wavelength region is represented by $\lambda_2$, the second image plane amplitude $A_1$ can be calculated by integrating the complex amplitude distribution on the image plane at the multi-wavelength region. The second image plane amplitude $A_1$ can be expressed, for example, by the following equation (8).

$$A_1(x, y) = \int_{\lambda_1}^{\lambda_2} d\lambda \frac{1}{\lambda f} F_0[G_1(\xi, \eta)] \quad (8)$$

$$= \int_{\lambda_1}^{\lambda_2} d\lambda \frac{1}{\lambda f} F_0\left[t(\xi, \eta) \times \exp\left(2\pi i \frac{W(\xi, \eta)}{\lambda}\right)\right]$$

Here, $A_1(x, y)$ is a function of the second image plane amplitude representing the complex amplitude distribution on the image plane.

The PSF correction unit 23 receives the point spread function $PS_M$ supplied from the data reception unit 30 as an input. The point spread function $PS_M$ is a measured light intensity distribution and reflects influences of various wavelengths in a multi-wavelength region that is an observable wavelength region. For this reason, if the wavefront aberration is calculated using the point spread function $PS_M$ as it is, the estimation accuracy of the wavefront aberration may be degraded. Therefore, the PSF correction unit 23 of the present embodiment uses the spatial frequency component of the first image plane amplitude $A_0$ and the spatial frequency component of the second image plane amplitude $A_1$ to suppress the spatial frequency components at wavelengths other than the reference wavelength $\lambda_0$ in the spatial frequency components of the point spread function $PS_M$, thereby correcting the point spread function $PS_M$. The PSF correction unit 23 gives a corrected point spread function $PS_S$ (hereinafter, referred to as "corrected point spread function $PS_S$") to the constraint condition applying unit 13.

Specifically, as shown in FIG. 1, the PSF correction unit 23 has a coefficient calculation unit 24 that calculates a ratio of a spatial frequency component of the first image plane amplitude $A_0$ to a spatial frequency component of the second image plane amplitude $A_1$ as a correction coefficient H, and a PSF generation unit 25 that executes a Fourier transform of the point spread function $PS_M$ to calculate a transfer function indicating a spatial frequency component. The PSF generation unit 25 calculates a weighted transfer function by weighting the transfer function with the correction coefficient H, and generates a corrected point spread function $PS_S$ by executing an inverse Fourier transform of the weighted transfer function.

When the first image plane amplitude $A_0(x, y)$ and the second image plane amplitude $A_1(x, y)$ as shown in the above equations (6) and (8) are given, the intensity distribution $D_0(x, y)$ of the first image plane amplitude $A_0(x, y)$ is given by the product of the first image plane amplitude $A_0(x, y)$ and its complex conjugate $A_0^*(x, y)$, and the intensity distribution $D_1(x, y)$ of the second image plane amplitude $A_1(x, y)$ is given by the product of the second image plane amplitude $A_1(x, y)$ and its complex conjugate $A_1^*(x, y)$. When a two-dimensional Fourier transform operator for calculating a spatial frequency component is represented by $F_1[\ ]$, a transfer function $T_0(u, v)$ representing a spatial frequency component of the first image plane amplitude $A_0$ can be expressed by the following equation (9).

$$T_0(u,v) = F_1[D_0(x,y)] \quad (9)$$

Here, u and v are variables respectively corresponding to x and y, and are values of coordinates in a rectangular coordinate system on a spatial frequency domain.

Further, a transfer function $T_1(u, v)$ representing a spatial frequency component of the second image plane amplitude $A_1$ can be expressed by the following equation (10).

$$T_1(u,v) = F_1[D_1(x,y)] \quad (10)$$

The correction coefficient H can be expressed, for example, by the following equation (11).

$$H(u,v) = T_0(u,v)/T_1(u,v) \quad (11)$$

Here, H(u, v) is a function representing a correction coefficient in the spatial frequency domain. The correction coefficient H(u, v) shown in the equation (11) is a ratio between a transfer function $T_1(u, v)$ representing a spatial frequency component of the second image plane amplitude $A_1$ and a transfer function $T_0(u, v)$ representing a spatial frequency component of the first image plane amplitude $A_0$, that is, a ratio between a transfer function $T_1(u, v)$ representing a spatial frequency spectrum component of the intensity distribution $D_1(x, y)$ at a multi-wavelength region (wavelength band from $\lambda_1$ to $\lambda_2$) and a transfer function $T_0(u, v)$ representing a spatial frequency spectrum component of the intensity distribution $D_0(x, y)$ at the reference wavelength $\lambda_0$. The intensity distribution $D_1(x, y)$ at the multi-wavelength region is a distribution in which a plurality of intensity distributions at a plurality of wavelengths in the multi-wavelength region is superimposed. When an imaging sensor having the multi-wavelength region as the sensitivity wavelength region measures a point spread function, the measured point spread function is an intensity distribution function obtained by superimposing a plurality of point spread functions at a plurality of wavelengths in the multi-wavelength region. For this reason, by multiplying (weighting) the spatial frequency spectrum component of the point spread function $PS_M(x, y)$ generated by the imaging sensor by the correction coefficient H(u, v), it is possible to obtain a spatial frequency spectrum component close to the spatial frequency spectrum component of the point spread function to be acquired at the reference wavelength $\lambda_0$. The coefficient calculation unit 24 can calculate the correction coefficient H(u, v) according to the above equation (11).

The PSF generation unit 25 calculates a transfer function $PT_M(u, v)$ indicating a spatial frequency component by executing a two-dimensional Fourier transform of the point spread function $PS_M(x, y)$ as shown in the following equation (12).

$$PT_M(u,v) = F_1[PS_M(x,y)] \quad (12)$$

Further, the PSF generation unit 25 calculates a weighted transfer function $PT_S(u, v)$ by weighting the transfer function $PT_M(u, v)$ with the correction coefficient $H(u, v)$ as shown in the following equation (13).

$$PT_S(u,v)=H(u,v)\times PT_M(u,v) \quad (13)$$

Then, the PSF generation unit 25 can calculate the corrected point spread function $PS_S(x, y)$ by executing an inverse Fourier transform of the weighted transfer function $PT_S(u, v)$ as shown in the following equation (14).

$$PS_S(x,y)=F_1^{-1}[PT_S(u,v)] \quad (14)$$

Here, $F_1^{-1}[\ ]$ is an inverse transform operator for the two-dimensional Fourier transform operator $F_1[\ ]$.

Since the correction coefficient $H(u, v)$ forms a distribution that relatively reduces the spatial frequency components of wavelengths other than the reference wavelength $\lambda_0$ and relatively emphasizes the spatial frequency component of the reference wavelength $\lambda_0$, in the corrected point spread function $PS_S(x, y)$, spatial frequency components at wavelengths other than the reference wavelength $\lambda_0$ are relatively suppressed, and the spatial frequency component at the reference wavelength $\lambda_0$ is relatively emphasized. Therefore, the influence of chromatic aberration on the measured point spread function $PS_M$ is corrected.

Next, the constraint condition applying unit 13 receives the first image plane amplitude $A_0$ and the corrected point spread function $PS_S$ as inputs and applies a second constraint condition (image plane constraint condition) using the corrected point spread function $PS_S$ to a first image plane amplitude $A_0$ to correct the first image plane amplitude $A_0$, thereby calculating a third image plane amplitude $A_2$. Specifically, the constraint condition applying unit 13 calculates the third image plane amplitude $A_2$ by replacing the real part (actual amplitude) of the first image plane amplitude $A_0$ with the real part (actual amplitude) of the image plane amplitude (complex amplitude) corresponding to the corrected point spread function $PS_S$.

When the actual amplitude of the image plane amplitude corresponding to the corrected point spread function $PS_S(x, y)$ is represented by $A_S(x, y)$, the actual amplitude $A_S(x, y)$ can be expressed by the following equation (15).

$$|A_S(x,y)|=\sqrt{|PS_S(x,y)|} \quad (15)$$

At this time, the third image plane amplitude $A_2$ can be expressed by the following equation (16).

$$A_2(x, y) = A_0(x, y)\frac{|A_S(x, y)|}{|A_0(x, y)|} = A_0(x, y) = \frac{\sqrt{|PS_S(x, y)|}}{|A_0(x, y)|} \quad (16)$$

Here, $A_2(x, y)$ is a function of the third image plane amplitude $A_2$ representing the complex amplitude distribution on the image plane.

Next, the third pupil-function generating unit 14 generates a third pupil function $G_2$ on the basis of the third image plane amplitude $A_2$. Specifically, the third pupil-function generating unit 14 can generate the third pupil function $G_2$ on the basis of the following equation (17).

$$G_2(\xi,\eta)=\lambda_0 f \times F_o^{-1}[A_2(x,y)] \quad (17)$$

Here, $G_2(\xi, \eta)$ is a function of the third pupil function $G_2$ representing a complex amplitude distribution on a pupil plane, and $F_o^{-1}[\ ]$ is an inverse transform operator for a two-dimensional Fourier transform operator $F_0[\ ]$.

The wavefront calculation unit 15 calculates a wavefront aberration $W_1$ on the pupil plane on the basis of the third pupil function $G_2$. Specifically, the wavefront calculation unit 15 can calculate the wavefront aberration $W_1$ on the basis of the following equation (18).

$$W_1(\xi,\eta)=(2\pi/\lambda_0)\times\arg(G_2(\xi,\eta)) \quad (18)$$

Here, $W_1(\xi, \eta)$ is a function representing the wavefront aberration $W_1$ on the pupil plane, and $\arg[x]$ is a phase component of an arbitrary complex number x.

The wavefront calculation unit 15 can cause the first pupil-function generating unit 11 and the second pupil-function generating unit 21 to execute an iterative operation by feeding back and inputting the calculated data of the wavefront aberration $W_1$ to the first pupil-function generating unit 11 and the second pupil-function generating unit 21. The first pupil-function generating unit 11, the first image-plane amplitude calculating unit 12, the second pupil-function generating unit 21, the second image-plane amplitude calculating unit 22, the PSF correction unit 23, the constraint condition applying unit 13, the third pupil-function generating unit 14, and the wavefront calculation unit 15 execute an iterative operation until the calculated wavefront aberration $W_1$ satisfies a convergence condition. The convergence condition may be, for example, a condition that an iterative operation is executed a prespecified number of times.

When the wavefront aberration $W_1$ satisfies the convergence condition, the data output unit 16 outputs wavefront data WD indicating the wavefront aberration $W_1$ to the outside of the data output unit 16. The wavefront data WD may be displayed on a display device (not shown) in the form of image data or in the form specifying Zernike coefficients, or may be stored in a memory. Further, the wavefront data WD may be supplied to a wavefront control device (not shown) forming a part of an adaptive optics system. The wavefront control device is a device that corrects the shape of the incident light wavefront on the basis of the wavefront data WD.

The hardware configuration of the above-described wavefront measurement device 2A may include, for example, one or more processors having a semiconductor integrated circuit such as a digital signal processor (DSP), an application specific integrated circuit (ASIC) or a field-programmable gate array (FPGA). Alternatively, the hardware configuration of the wavefront measurement device 2A may include one or more processors including an arithmetic device such as a central processing unit (CPU) or a graphics processing unit (GPU) that executes program code of software or firmware read from a non-volatile memory. The hardware configuration of the wavefront measurement device 2A may include one or more processors including a combination of a semiconductor integrated circuit such as a DSP and an arithmetic device such as a CPU.

FIG. 2 is a block diagram schematically showing a configuration of an information processing device 40 that is an example of a hardware configuration that achieves the function of the wavefront measurement device 2A. The information processing device 40 includes a processor 41, a memory 42, an input interface unit 43, an output interface unit 44, and a signal path 45. The signal path 45 is a bus for mutually connecting the processor 41, the memory 42, the input interface unit 43, and the output interface unit 44. The input interface unit 43 has a function of transferring measurement data TD input from the outside to the processor 41 via the signal path 45. The processor 41 generates wavefront data WD by using the transferred measurement data TD, and can output the wavefront data WD to an external device such as a wavefront control device or a data storage device via the signal path 45 and the output interface unit 44.

Here, the memory 42 is a data storage area used when the processor 41 executes digital signal processing. When the processor 41 incorporates an arithmetic device such as a CPU, the memory 42 has a data storage area for storing a program code of software or firmware executed by the processor 41. As such a memory 42, for example, a semiconductor memory such as a read only memory (ROM) and a synchronous dynamic random access memory (SDRAM) can be used.

Figure 3:
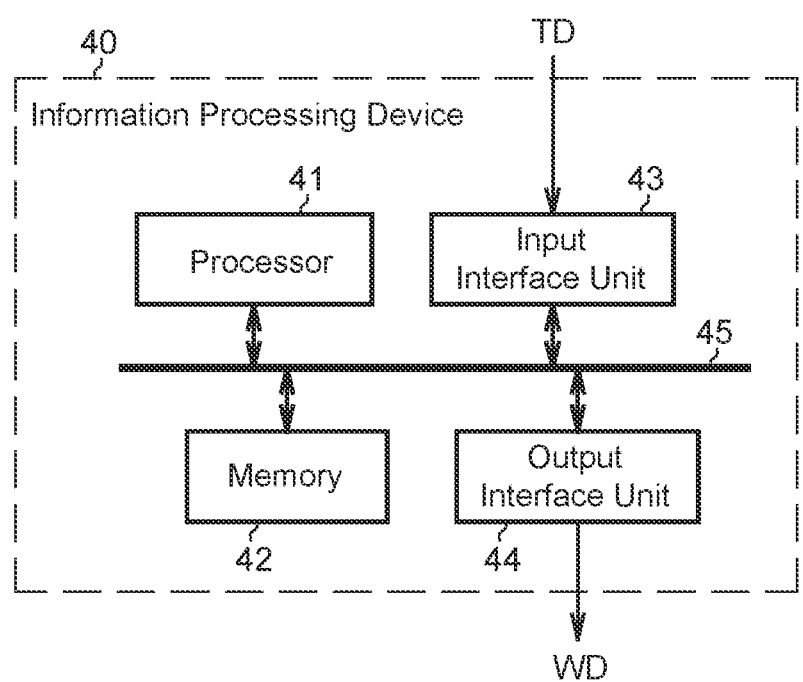
FIG. 3 is a block diagram schematically showing an example of a hardware configuration for achieving functions of a wavefront measurement device according to the first embodiment.
Figure 4:
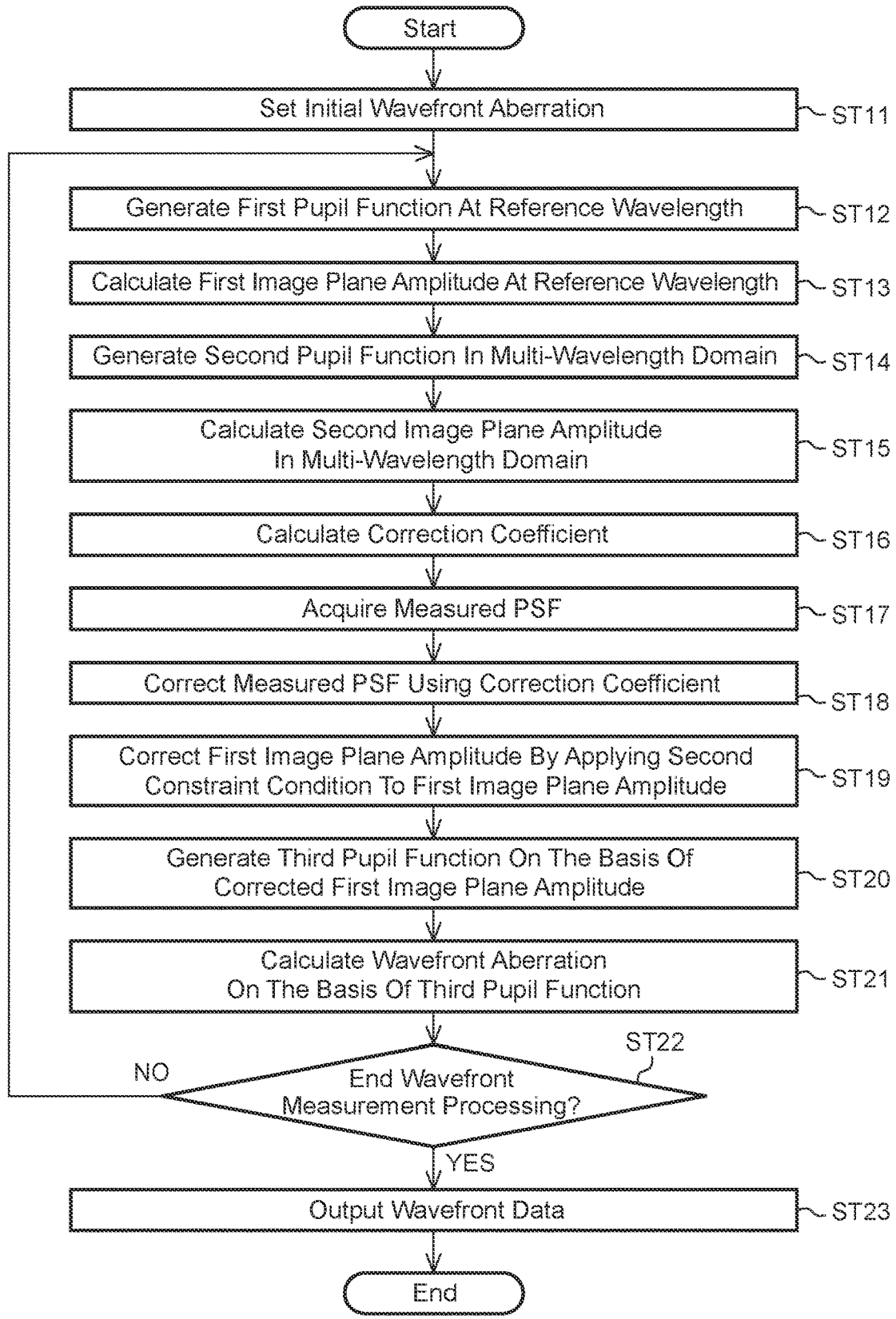
FIG. 4 is a flowchart schematically showing an example of a procedure of wavefront measurement processing according to the first embodiment.

Next, an operation procedure of the above-described wavefront measurement device 2A will be described with reference to FIG. 3. FIG. 3 is a flowchart schematically showing an example of the procedure of wavefront measurement processing according to the first embodiment.

Referring to FIG. 3, the wavefront setting unit 10 sets an initial wavefront aberration $W_0$, and supplies the set initial wavefront aberration $W_0$ to the first pupil-function generating unit 11 and the second pupil-function generating unit 21 (step ST11).

Next, the first pupil-function generating unit 11 calculates the first optical phase distribution on the pupil plane at the reference wavelength $\lambda_0$ on the basis of the input data of the initial wavefront aberration $W_0$, and generates the first pupil function $G_0$ by applying the first constraint condition (pupil plane constraint condition) to the first optical phase distribution (step ST12). Next, the first image-plane amplitude calculating unit 12 calculates the first image plane amplitude $A_0$ at the reference wavelength $\lambda_0$ on the basis of the first pupil function $G_0$ (step ST13).

In addition, the second pupil-function generating unit 21 calculates the second optical phase distribution on the pupil plane at a multi-wavelength region on the basis of the input data of the initial wavefront aberration $W_0$, and generates the second pupil function $G_1$ by applying the first constraint condition to the second optical phase distribution (step ST14). Next, the second image-plane amplitude calculating unit 22 calculates the second image plane amplitude $A_1$ at a multi-wavelength region on the basis of the second pupil function $G_1$ (step ST15). Note that, steps ST12 and ST13 and steps ST14 and ST16 may be executed in the reverse order of the above processing order, or may be executed simultaneously and in parallel.

Next, the coefficient calculation unit 24 calculates, as the correction coefficient H, the ratio of the spatial frequency component of the first image plane amplitude $A_0$ to the spatial frequency component of the second image plane amplitude $A_1$ (step ST16). Next, the PSF generation unit 25 acquires the measured point spread function (measured PSF) $PS_M$ from the data reception unit 30 (step ST17), and calculates the corrected point spread function (corrected PSF) $PS_S$ by correcting the point spread function $PS_M$ by using the correction coefficient H (step ST18).

Next, the constraint condition applying unit 13 applies the second constraint condition (image plane constraint condition) using the corrected point spread function $PS_S$ to the first image plane amplitude $A_0$ to correct the first image plane amplitude $A_0$, thereby calculating the third image plane amplitude $A_2$ (step ST19). Next, the third pupil-function generating unit 14 generates the third pupil function $G_2$ on the basis of the third image plane amplitude $A_2$ (step ST20). The wavefront calculation unit 15 calculates the wavefront aberration $W_1$ on the pupil plane on the basis of the third pupil function $G_2$ (step ST21).

Next, the wavefront calculation unit 15 determines whether or not to end the wavefront measurement processing (step ST22). Specifically, when the wavefront aberration $W_1$ does not satisfy the convergence condition described above, the wavefront calculation unit 15 does not end the wavefront measurement processing (NO in step ST22) and causes the first pupil-function generating unit 11 and the second pupil-function generating unit 21 to execute the iterative operation by feeding back and inputting the calculated data of the wavefront aberration $W_1$ to the first pupil-function generating unit 11 and the second pupil-function generating unit 21 (steps ST12 to ST21). Thereafter, when the wavefront aberration $W_1$ satisfies the convergence condition described above, the wavefront calculation unit 15 determines to end the wavefront measurement processing (YES in step ST22). In this case, the data output unit 16 outputs the wavefront data WD indicating the wavefront aberration $W_1$ to the outside of the data output unit 16 (step ST23).

As described above, in the first embodiment, the wavefront measurement device 2A executes iterative processing by using the corrected point spread function $PS_S$ generated by the PSF correction unit 23 instead of using the measured point spread function $PS_M$ as it is. In the corrected point spread function $PS_S$, spatial frequency components at wavelengths other than the reference wavelength $\lambda_0$ are relatively suppressed, and a spatial frequency component at the reference wavelength $\lambda_0$ is relatively emphasized. Therefore, the wavefront measurement device 2A can accurately estimate the wavefront aberration $W_1$ on the pupil plane even when the observable wavelength region, that is, the multi-wavelength region is wide.

A detector such as an imaging device has sensitivity to light at a multi-wavelength region of a finite width, and as the bandwidth of the multi-wavelength region is wider with respect to its center wavelength, the difference in the observed image between the wavelengths increases due to the wavelength dependency of the Airy disk diameter of the observed diffraction image and the wavelength dependency of the spatial phase on the pupil plane caused by the wavefront aberration. For this reason, if the wavefront aberration is calculated using the point spread function $PS_M$ as it is, the estimation accuracy of the wavefront aberration may be degraded. On the other hand, in the present embodiment, since the wavefront aberration is calculated using the corrected point spread function $PS_S(x, y)$, the wavefront aberration $W_1$ can be estimated with high accuracy.

In addition, since the wavefront measurement device 2A executes the iterative operation until the calculated wavefront aberration $W_1$ satisfies the convergence condition, the corrected point spread function $PS_S$ approaches an ideal distribution in the process of the iterative operation. Therefore, a synergistic effect that the estimation accuracy of the corrected point spread function $PS_S$ is improved and the estimation accuracy of the wavefront aberration $W_1$ is improved at the same time can be expected.

Second Embodiment

Figure 5:
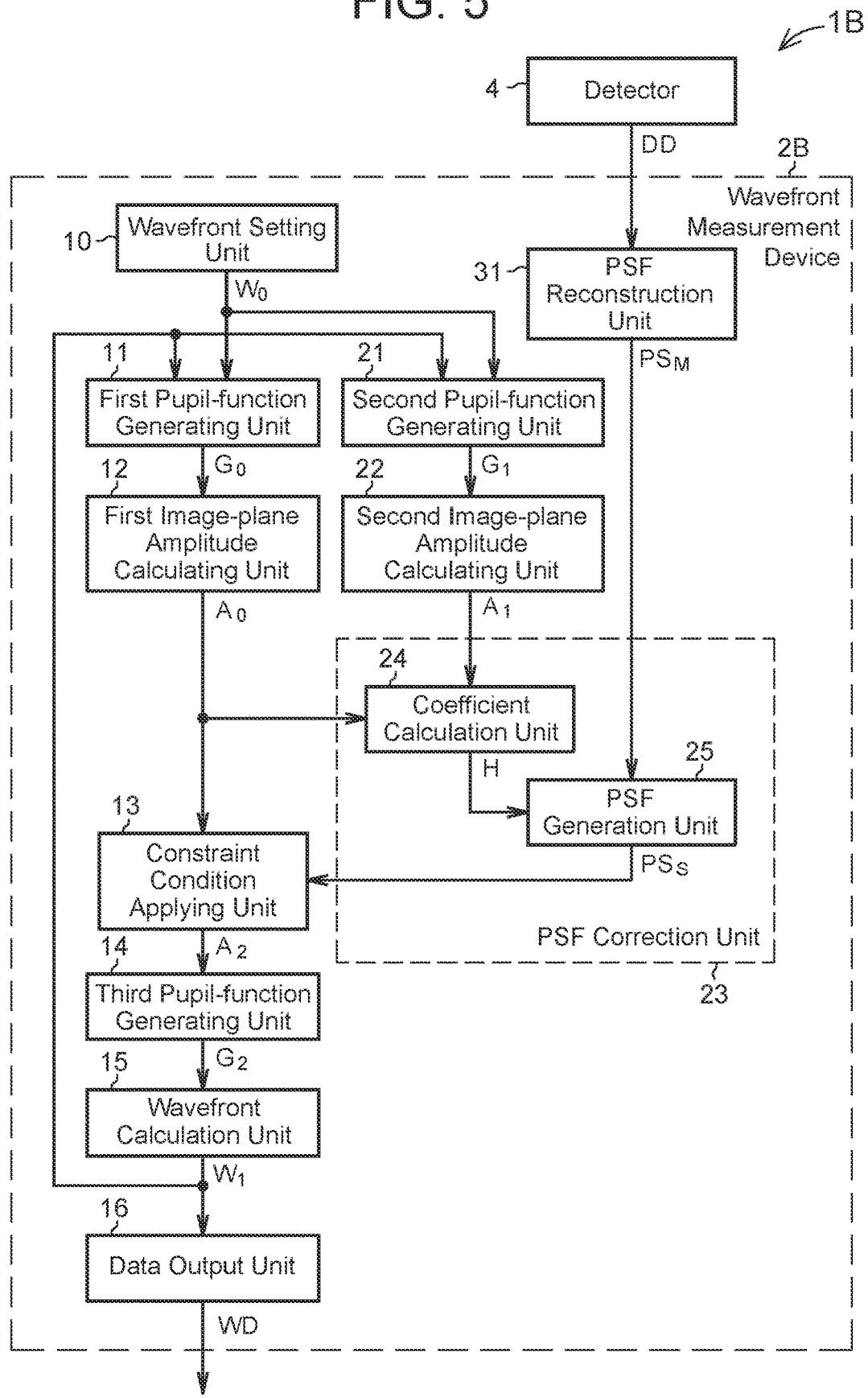
FIG. 5 is a block diagram schematically showing a configuration of a wavefront measurement system according to a second embodiment of the present invention.

Next, a second embodiment according to the present invention will be described below. FIG. 5 is a block diagram schematically showing a configuration of a wavefront measurement system 1B according to the second embodiment of the present invention. As shown in FIG. 5, the wavefront measurement system 1B includes a detector 4 that supplies detection data DD indicating a plurality of point spread functions, and a wavefront measurement device 2B. The configuration of the wavefront measurement device 2B is the same as the configuration of the wavefront measurement device 2A of the first embodiment except that the data reception unit 30 in FIG. 1 is replaced with a PSF reconstruction unit 31 in FIG. 5.

Figure 6:
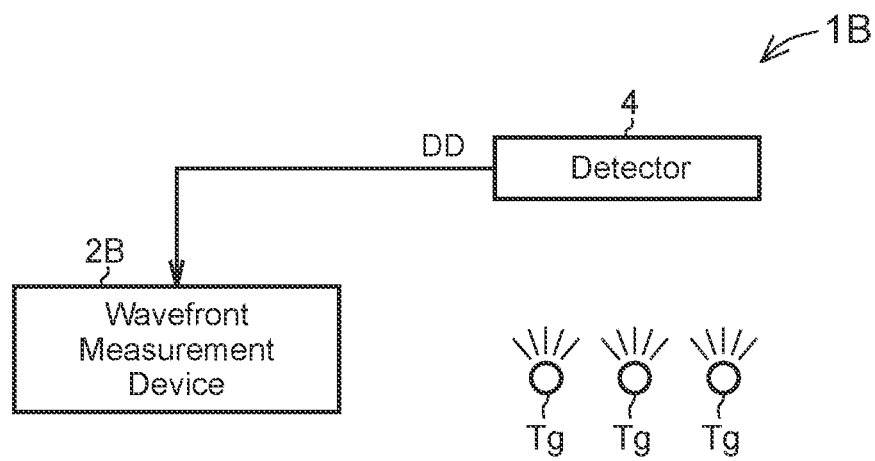
FIG. 6 is a diagram schematically showing an example of the wavefront measurement system according to the second embodiment.
Figure 7:
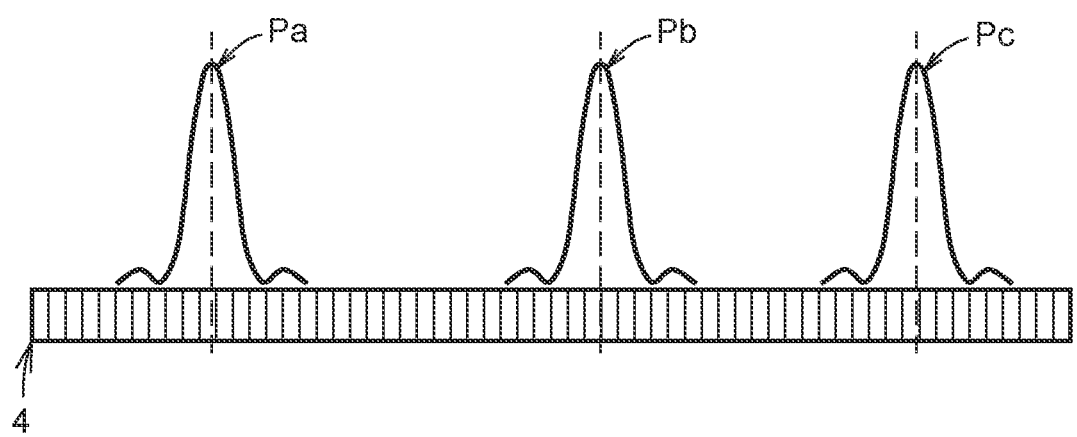
FIG. 7 is a schematic diagram showing a relationship between a detector and a point image intensity distribution.

The detector 4 has a function of imaging a plurality of point light sources (targets) for evaluating a point spread function (PSF) and detecting a plurality of point spread functions. The detector 4 may be composed of, for example, a high-sensitivity imaging device. FIG. 6 is a diagram showing how the detector 4 images three targets Tg, Tg, and Tg. FIG. 7 is a schematic diagram showing point image distributions Pa, Pb, and Pc detected on the basis of observed images of these three targets Tg, Tg, and Tg. The detector 4 transfers the detection data DD indicating the plurality of detected point spread functions to the wavefront measurement device 2B.

The target for PSF evaluation may be, for example, a light source installed on the ground as described in Non-Patent Literature 3 below, or a star as described in Non-Patent Literature 4 below.

Non-Patent Literature 3: M. Taylor, "In-flight performance assessment of imaging systems using the specular array radiometric calibration (SPARC) method", 11th Annual Joint Agency Commercial Imagery Evaluation (JACIE) Workshop (2012).

Non-Patent Literature 4: Jay Anderson and Ivan R. King, "Toward High-Precision Astrometry with WFPC2.I. Deriving an Accurate Point-Spread Function", PASP, Vol. 112, No. 776, pp. 1360-1382, (2000).

The PSF reconstruction unit 31 reconstructs a single point spread function on the basis of a plurality of point spread functions included in the detection data DD, and can supply the single point spread function to the PSF correction unit 23 as a measured point spread function $PS_M$. For example, the PSF reconstruction unit 31 calculates a spatial phase of a plurality of point spread functions and can reconstruct a high-resolution point spread function $PS_M$ by combining the plurality of point spread functions on the basis of the calculation results.

Further, when the detector 4 as an imaging device detects a point image, as described in Non-Patent Literature 3 or Non-Patent Literature 4, the detector 4 detects a plurality of point images each having a size less than the detector pitch and having a different phase shift, and thereby the PSF reconstruction unit 31 can reconstruct a higher-resolution point spread function. In the example of FIG. 7, the point image distribution Pa is formed at the center of the detector 4, and the point image distributions Pb and Pc are formed at positions shifted rightward with respect to the point image distribution Pa. If the point image distributions Pa, Pb, and Pc with phase shifts having different sizes from each other, of less than one pixel can be obtained, the PSF reconstruction unit 31 can reconstruct a high-resolution point spread function $PS_M$ by combining the point spread functions of these point image distributions Pa, Pb, and Pc.

For example, when a plurality of light sources for point image acquisition is installed at the imaging target point, by adjusting the interval between the light sources so that a phase shift of less than the detector pitch occurs on the detector 4, the above-described phase shift of less than the detector pitch can be made to occur. Further, when the spatial resolution of the imaging device is d meters, for example, if a plurality of light sources is arranged at regular intervals with an interval of 1.2×d meters, on a captured image obtained by imaging the plurality of light sources, it is possible to set conditions so that a plurality of point images arranged at equal intervals at 0.2 pixel intervals appears. In this case, with respect to a certain point image (first point image), an adjacent second point image has a phase shift of 0.2 pixels less than the detector pitch. Further, a third point image adjacent to the second point image has a phase shift of 0.4 pixels with respect to the first point image.

Figure 8:
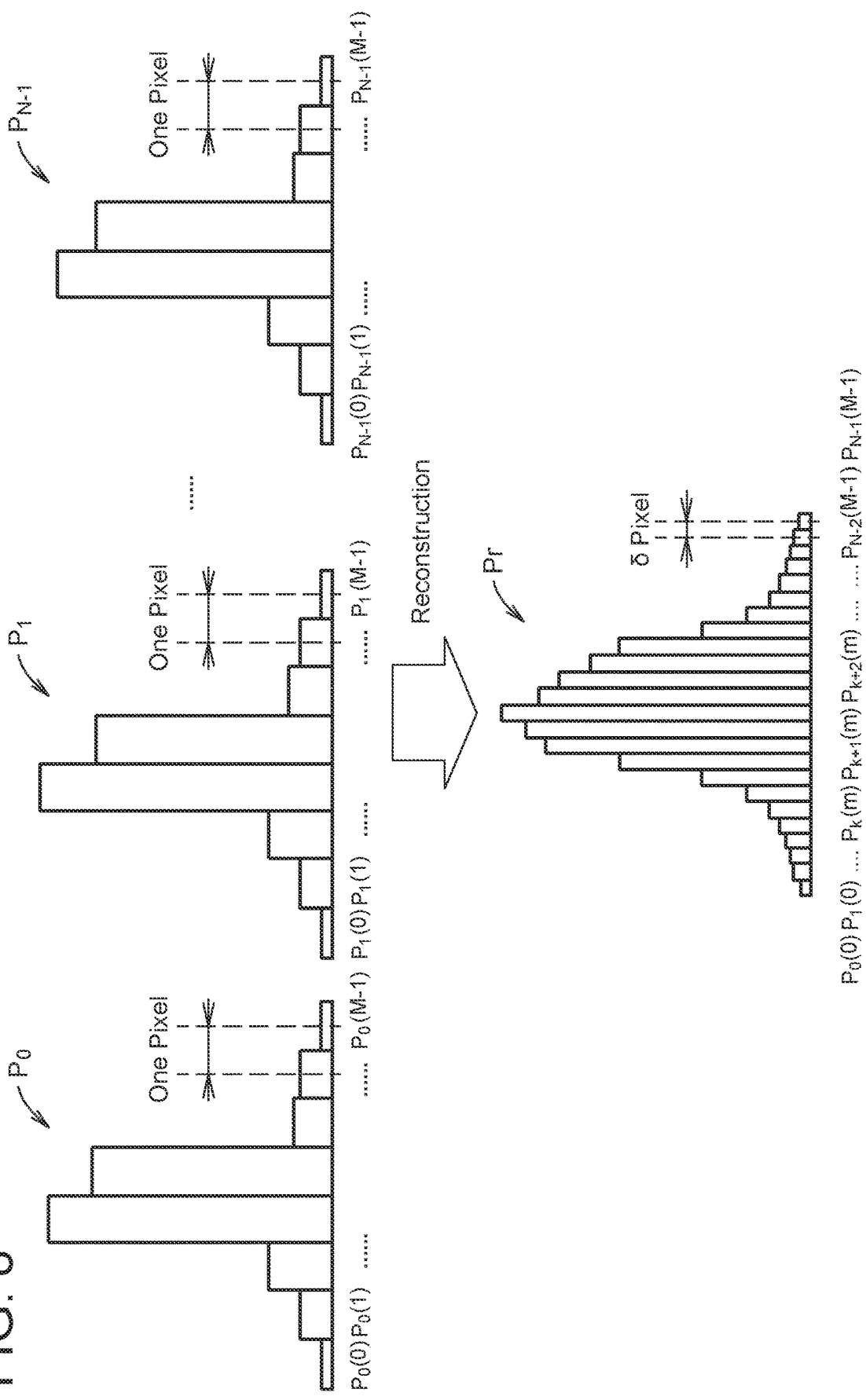
FIG. 8 is a schematic diagram for explaining an example of a method of reconstructing a point spread function according to the second embodiment.

FIG. 8 is a schematic diagram for explaining an example of a method of reconstructing a point spread function. As shown in FIG. 8, when N point spread functions $P_0, P_1, \ldots, P_{N-1}$ are obtained, each point spread function $P_k$ (k is an arbitrary integer of 1 to N-1) is assumed to include a pixel value sequence $\{P_k(0), P_k(1), \ldots, P_k(M-1)\}$ (M is a positive integer) composed of M pixel values. The PSF reconstruction unit 31 rearranges the pixel values of the point spread functions $P_0, P_1, \ldots, P_{N-1}$ to generate a pixel value sequence having an arrangement as shown below, thereby obtaining a point spread function $P_r$ having δ times higher resolution. Here, it is desirable that the obtained high-resolution point spread function $P_r$ is normalized so that the sum of the pixel values is one.

$$\{P_0(0), P_1(0), \ldots, P_{N-1}(0), \ldots, P_0(m),$$
$$P_1(m), \ldots, P_{N-1}(m), \ldots, P_0(M-1), P_1(M-1), \ldots$$
$$., P_{N-1}(M-1)\}$$

Although the example of FIG. 8 illustrates a method of reconstructing a one-dimensional point spread function, a two-dimensional point spread function may be reconstructed by applying a similar method.

As described above, in the second embodiment, similarly to the case of the first embodiment, since the wavefront measurement device 2B executes iterative processing using the corrected point spread function $PS_S$ generated by the PSF correction unit 23 instead of using the measured point spread function $PS_M$ as it is, it is possible to estimate the wavefront aberration $W_1$ on the pupil plane with high accuracy even if the observable wavelength region, that is, the multi-wavelength region is wide. In the present embodiment, further, since the PSF reconstruction unit 31 reconstructs the high-resolution point spread function $PS_M$ on the basis of the plurality of point spread functions, compared with the case of the first embodiment, the wavefront aberration $W_1$ can be estimated with higher accuracy.

Third Embodiment

Figure 9:
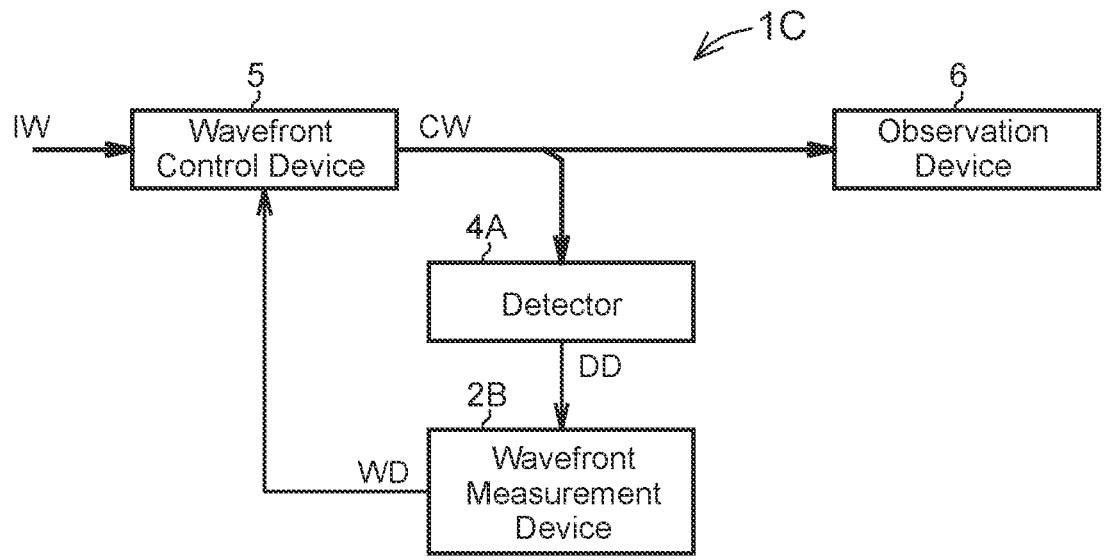
FIG. 9 is a block diagram schematically showing a configuration of a wavefront measurement system according to a third embodiment of the present invention.

Next, a third embodiment according to the present invention will be described. FIG. 9 is a block diagram schematically showing a configuration of a wavefront measurement system 1C according to the third embodiment of the present invention. As shown in FIG. 9, the wavefront measurement system 1C includes a wavefront control device 5 that corrects the distortion of an incident light wavefront IW and outputs a light wavefront CW, an observation device 6 that observes the light wavefront CW, a detector 4A that detects an image of the light wavefront CW and outputs the detection data DD, and the wavefront measurement device 2B (FIG. 5) that outputs wavefront data WD on the basis of the detection data DD.

The detector 4A has a function of imaging a plurality of point light sources (targets) for evaluating a point spread function (PSF) and detecting one or more point spread functions. The detector 4 may be composed of, for example, a high-sensitivity imaging device. The detector 4 transfers the detection data DD indicating one or more detected point spread functions to the wavefront measurement device 2B. Here, when the detection data DD indicating a single point spread function is transferred to the wavefront measurement device 2B, the wavefront measurement device 2B may execute the wavefront measurement processing by using the single point spread function.

As described above, the wavefront measurement device 2B estimates the wavefront aberration $W_1$ on the basis of the detection data DD and outputs the wavefront data WD indicating the estimated wavefront aberration $W_1$ to the wavefront control device 5. The wavefront control device 5 can correct the distortion of the light wavefront IW incident from the external space on the basis of the wavefront data WD. Therefore, since the wavefront control device 5 can correct the wavefront aberration caused by the change in the characteristic of the light propagation path (for example, fluctuation of the atmosphere), the observation device 6 can obtain a high-resolution observed image. Therefore, the wavefront measurement system 1C constitutes an adaptive optics system.

The wavefront control device 5 may have a configuration to correct the distortion of the incident light wavefront IW, for example, by using a deformable mirror, as described in Non-Patent Literature 5 below, or, as described in Non-Patent Literature 6 below, may have a configuration to correct the distortion of the incident light wavefront IW by adjusting the optical characteristics of the diffractive optical system.

Non-Patent Literature 5: Mingshuang Huang, Zhizheng Wu, Lingkun Min, Junqiu Wu, "Adaptive Surface Shape Control for Magnetic Fluid Deformable Mirrors", International Conference on Control, Automation and Information Sciences (ICCAIS) (2015).

Non-Patent Literature 6: Li Dongming, Gai Mengye, Chen Haochuan, Zhu Guang, and Zhang Lijuan, "Research on Wavefront Correction Algorithm of Adaptive Optics System", 4th International Conference on Computer Science and Network Technology (ICCSNT) (2015).

Figure 10:
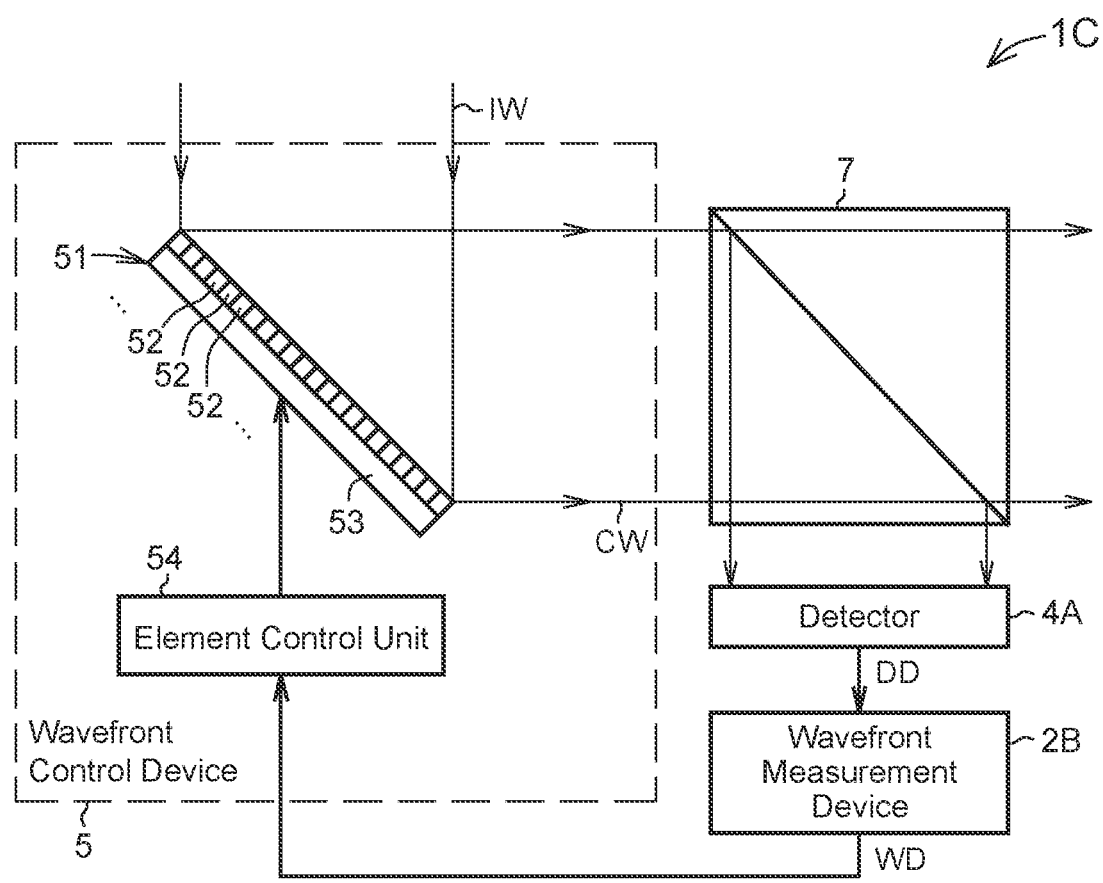
FIG. 10 is a diagram schematically showing a specific example of the wavefront measurement system according to the third embodiment.

FIG. 10 is a block diagram schematically showing a configuration example of the wavefront control device 5. As shown in FIG. 10, the wavefront control device 5 includes a wavefront control element 51 having a deformable reflection surface and an element control unit 54 for controlling the operation of the wavefront control element 51. The wavefront control element 51 includes micromirrors 52, . . . , 52 for reflecting the incident light wavefront IW to form an output light wavefront CW, and an actuator (drive unit) 53 for adjusting the direction of the reflection surface of each of these micromirrors 52, . . . , 52. Most of the output light wavefront CW enters the observation device 6 via a beam splitter 7. Further, a part of the output light wavefront CW is separated from the output light wavefront CW by the beam splitter 7 and enters the detector 4A. The element control unit 54 controls the actuator 53 on the basis of the wavefront data WD to adjust the shape of the reflection surface of the entire micromirrors 52, . . . , 52, thereby allowing the wavefront control element 51 to correct the distortion of the light wavefront IW incident from the external space.

Fourth Embodiment

Figure 11:
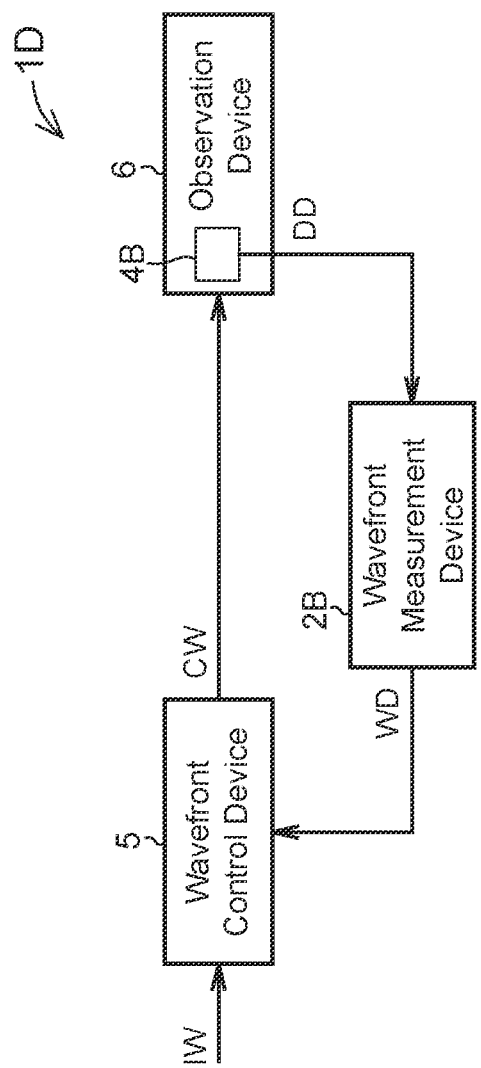
FIG. 11 is a block diagram schematically showing a configuration of a wavefront measurement system according to a fourth embodiment of the present invention.

Next, a fourth embodiment according to the present invention will be described. FIG. 11 is a block diagram schematically showing a configuration of a wavefront measurement system 1D according to the fourth embodiment of the present invention. As shown in FIG. 11, the wavefront measurement system 1D includes a wavefront control device 5 that corrects the shape of the incident light wavefront IW and outputs the light wavefront CW, a detector 4B incorporated in the observation device 6 that observes the output light wavefront CW and the wavefront measurement device 2B (FIG. 5) that outputs wavefront data WD on the basis of the detection data DD supplied from the detector 4B.

The detector 4B is an observation detector including a high-sensitivity imaging device. The detector 4B has a function of imaging a plurality of point light sources (targets) for evaluating a point spread function (PSF) and detecting one or more point spread functions. The detector 4B transfers the detection data DD indicating one or more detected point spread functions to the wavefront measurement device 2B. When the detection data DD indicating a single point spread function is transferred to the wavefront measurement device 2B, the wavefront measurement device 2B may execute the wavefront measurement processing by using the single point spread function.

As described above, the wavefront measurement device 2B estimates the wavefront aberration $W_1$ on the basis of the detection data DD and outputs the wavefront data WD indicating the estimated wavefront aberration $W_1$ to the wavefront control device 5. The wavefront control device 5 has a function of correcting the shape of the light wavefront IW incident from the external space on the basis of the wavefront data WD. The wavefront measurement device 2B can estimate the wavefront aberration $W_1$ caused by a change in the characteristics of the optical system (the imaging optical system or the reflection optical system or both of them) (for example, a change in the optical characteristics due to a temperature change) inside the observation device 6. Since the wavefront control device 5 can compensate for characteristics such as the imaging performance of the optical system inside the observation device 6, the observation device 6 can obtain a high-resolution observed image. Therefore, the wavefront measurement system 1D constitutes an adaptive optics system.

As mentioned above, although various embodiments according to the present invention have been described with reference to the drawings, these embodiments are merely examples of the present invention, and various forms other than these embodiments can be adopted.

For example, the hardware configuration of the wavefront measurement device 2B of the second embodiment may include, as in the case of the first embodiment, for example, one or more processors having a semiconductor integrated circuit such as a DSP, an ASIC, or an FPGA. Alternatively, the hardware configuration of the wavefront measurement device 2B may include one or more processors including an arithmetic device such as a CPU or a GPU that executes a program code of software or firmware read from a memory. The hardware configuration of the wavefront measurement device 2B may include one or more processors including a combination of a semiconductor integrated circuit such as a DSP and an arithmetic device such as a CPU. Furthermore, the hardware configuration of the wavefront measurement device 2B may include the information processing device 40 shown in FIG. 3.

Note that, within the scope of the present invention, free combinations of the first to fourth embodiments, deformation of any component of each embodiment, or omission of any component of each embodiment are possible.

INDUSTRIAL APPLICABILITY

The wavefront measurement device and the wavefront measurement system according to the present invention can be used to measure or evaluate characteristics of an object such as a light source, an optical system (e.g., a lens or a reflector) or a light propagation path, and, for example, it can be used in an adaptive optics system, or a system that inspects characteristics of a light source or an optical system.

REFERENCE SIGNS LIST 1A, 1B, 1C, and 1D: Wavefront measurement system, 2A and 2B: Wavefront measurement device, 3: Data supply unit, 4, 4A, and 4B: Detector, 5: Wavefront control device, 6: Observation device, 7: Beam splitter, 10: Wavefront setting unit, 11: First pupil-function generating unit, 12: First image-plane amplitude calculating unit, 13: Constraint condition applying unit, 14: Third pupil-function generating unit, 15: Wavefront calculation unit, 16: Data output unit, 21: Second pupil-function generating unit, 22: Second image-plane amplitude calculating unit, 23: PSF correction unit, 24: Coefficient calculation unit, 25: PSF generation unit, 30: Data reception unit, 31: PSF reconstruction unit, 40: Information processing device, 41: Processor, 42: Memory, 43: Input interface unit, 44: Output interface unit, 45: Signal path, 51: Wavefront control element, 52: Micromirror, 53: Actuator, 54: Element control unit.

The invention claimed is:

1. A wavefront measurement device comprising:
processing circuitry performing a process of:
generating a first pupil function by calculating a first optical phase distribution on a pupil plane at a reference wavelength selected from a multi-wavelength region on a basis of input data of a wavefront aberration and applying a first constraint condition to the first optical phase distribution;
calculating a first image plane amplitude at the reference wavelength on a basis of the first pupil function;
generating a second pupil function by calculating a second optical phase distribution on the pupil plane in the multi-wavelength region on the basis of the input data and applying the first constraint condition to the second optical phase distribution;
calculating a second image plane amplitude in the multi-wavelength region on a basis of the second pupil function;
correcting a measured point spread function by suppressing spatial frequency components at wavelengths other than the reference wavelength in spatial frequency components of the point spread function by using a spatial frequency component of the first image plane amplitude and a spatial frequency component of the second image plane amplitude;
applying a second constraint condition using the corrected point spread function to the first image plane amplitude to correct the first image plane amplitude;
generating a third pupil function on a basis of the corrected first image plane amplitude; and
calculating a wavefront aberration on the pupil plane on a basis of the third pupil function, wherein
the process, by inputting data of the calculated wavefront aberration, executes an iterative operation.

2. The wavefront measurement device according to claim 1, wherein the process executes the iterative operation until the calculated wavefront aberration satisfies a convergence condition.

3. The wavefront measurement device according to claim 1, the process further comprising inputting data of an initial wavefront aberration set for the iterative operation.

4. The wavefront measurement device according to claim 1, wherein
the process includes
calculating a ratio of the spatial frequency component of the first image plane amplitude to the spatial frequency component of the second image plane amplitude as a correction coefficient, and
calculating a transfer function by executing a Fourier transform of the measured point spread function and calculating a weighted transfer function by weighting the transfer function with the correction coefficient, and
the process generates the corrected point spread function by executing an inverse Fourier transform of the weighted transfer function.

5. The wavefront measurement device according to claim 1, the process further comprising
reconstructing a single point spread function on a basis of a plurality of point spread functions, wherein
the process provides the single point spread function as the measured point spread function.

6. The wavefront measurement device according to claim 1, wherein the first constraint condition is a condition in which intensity on the pupil plane is spatially limited.

7. The wavefront measurement device according to claim 1, wherein the second constraint condition is a condition in which an actual amplitude of the first image plane amplitude is replaced with an actual amplitude of a complex amplitude corresponding to the point spread function corrected.

8. A wavefront measurement system comprising:
the wavefront measurement device according to claim 1; and
a detector to detect one or more point spread functions by imaging a point light source, wherein
the process generates the measured point spread function from the one or more point spread functions detected by the detector.

9. The wavefront measurement system according to claim 8, further comprising a wavefront control device to correct a shape of an incident light wavefront on a basis of the data of the wavefront aberration calculated.

* * * * *